Feb. 14, 1961     J. E. DUBOIS     2,972,102
METHOD AND DEVICE FOR THE TITRATION OF
VARIOUS SOLUTIONS AND SIMILAR PURPOSES
Filed Dec. 20, 1955
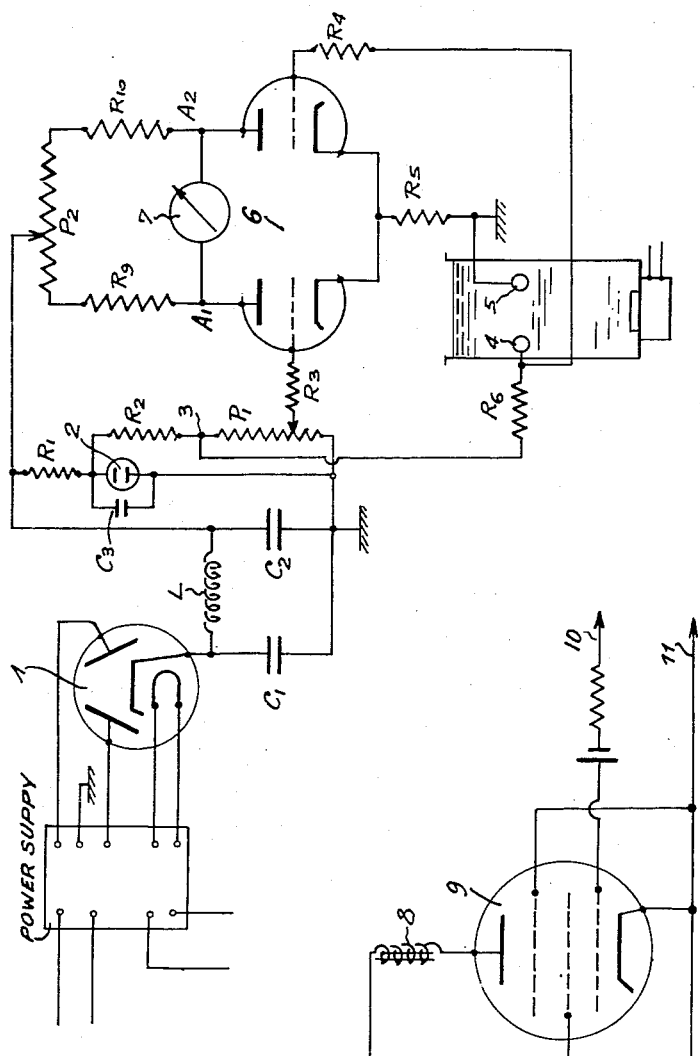
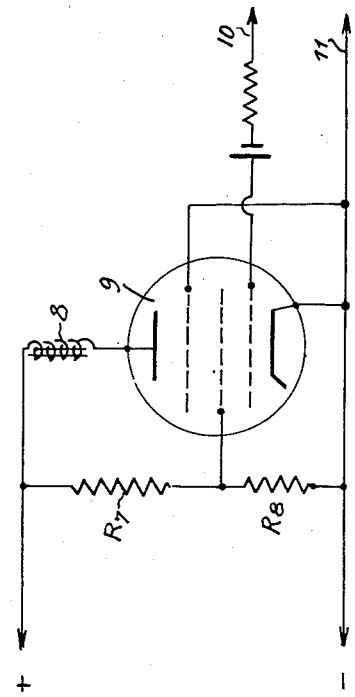
INVENTOR
JACQUES E. DUBOIS

United States Patent Office 2,972,102
Patented Feb. 14, 1961

2,972,102

METHOD AND DEVICE FOR THE TITRATION OF VARIOUS SOLUTIONS AND SIMILAR PURPOSES

Jacques Emile Dubois, 3 Max-Plaackstrasse, Saarbrucken, Saarland

Filed Dec. 20, 1955, Ser. No. 554,330

Claims priority, application France Dec. 31, 1954

8 Claims. (Cl. 324—30)

As demonstrated by various authors, we know how to determine the balancing or neutral point of an iodometric mixture according to a method which is known in scientific circles under the name of the "dead stop end point" method, this method being also known under the name of "polarised electrode method." Nevertheless, the field of application of this method is very confined, seeing that it can only be used with mixtures of the iodometric type. Under these conditions, when electrodes under given voltages which are generally very weak (of about 15 mv.) are dipped into a solution to be titrated, they show a certain polarisation which is abruptly modified when a titrating solution is added to the solution to be titrated in a sufficient quantity to carry out titration.

This invention deals with a new process and device for operating it enabling the end point of titrating operations to be exactly ascertained no matter what the nature of the solution to be titrated (dosing by oxido-reduction, precipitation or neutralisation, example, base-acid, etc.) as well as its dilution, and this by applying to the electrodes, under given conditions, a voltage that is relatively higher than according to the above-mentioned method and which may be about 3 v.

According to the invention, the device comprises a relatively high voltage current generator, this current being rectified and stabilised so that the direct tension at the anode of the voltage stabilising unit is transmitted, through the intermediary of a potentiometrically controlled circuit and through a large resistance, to an electrode placed inside a vessel containing the solution to be titrated, as well as a second electrode that is grounded, the voltage variations between these two electrodes during titration being amplified by a device connected to a measuring apparatus adjusted so as to indicate the moment when the polarisation of the electrodes changes, which causes an inflection point to appear on a curve drawn, showing, for example, the deviations of the measuring apparatus in ordinates, and in abcissae, the volumes of the titrating solution added to the solution to be titrated.

Various other characteristics of the invention will moreover be revealed in the detailed description which follows.

Forms of embodiment of the purpose of the invention are shown, by way of non-restrictive examples, in the accompanying drawing.

Figures 1 and 2 are diagrams illustrating one form of embodiment of the device.

It has been observed, according to the method of the invention, that a direct tension U applied to two platinum electrodes inserted in an electrolysis circuit, the current $i$ of which being maintained to a very low intensity, introduces a lack of symmetry in the chemical and physical phenomena on the two electrodes immersed in the solution to be titrated. In these conditions, the two electrodes are submitted respectively to potentials of polarisation $Ea$ and $Ec$ which are separatively or simultaneously modified abruptly at the titration end point; this change leads to a variation $\Delta E$ of $E=Ea-Ec$.

The origins of these variations are associated either to different electrode potentials in the titration medium before and after the end point or to different potenials in relation to electrochemical transformation process uses, for example, oxido-reduction, which precede and follow the titration end point.

According to the invention, it has been found to determine the tension U available in the circuit of electrolysis so that this tension is higher than the greatest value of E which corresponds to one of the important transformations occuring during the titration (for example, acid-base titration) and is used simultaneously with a large resistance placed in the circuit, the purpose of which is to limit to a very low value the intensity of the current. The variation $\Delta E$ is indicated, after amplification by means of an electronic voltmeter designed for that purpose.

The amplified potential jump is used for setting in action an indicator apparatus. The amplification required obviously depends on the characteristics of the indicator apparatus employed. It is possible to use various types of amplifying tubes by adopting suitable values for the anodic and cathodic resistances. The tension to be applied to the electrodes is supplied by a potentiometric device interposed between the high tension also called D.-C. plate supply, and the ground, this high tension being preferably selected in the region of 300 volts.

The tension of 300 volts is given, for example, by an ordinary rectifier. One of the electrodes dipped into the solution whose titration is to be effected, is grounded, the other is connected to a tension of about 3 volts, through the intermediary of a resistance of magnitude of about 0.1 megohm. Simultaneously, the latter electrode is connected by a second resistance of about 0.5 megohm to the grid of the amplifying tube.

The indicator device enabling the potential jump to be controlled may, in certain cases, be formed by a "magic eye." In this case, the "magic eye" is used as the anodic resistance of the amplifying tube. The sensitive point of the "magic eye" is obtained by varying the voltage of its grid using for this purpose a potentiometer branched between the positive pole of the 300 volts high tension and the ground. Should there be a tension variation of the grid of the amplifying tube, the cathodic potential of the "magic eye" also varies, so that this "eye" opens and closes.

The "magic eye" can also be employed by branching it between the positive pole of the 300 volts high tension and the ground.

A fixed value of the cathodic potential may be obtained by means of the potentiometric device. This value should be established so that a variation of the grid potential opens or closes the "magic eye." In the latter case, the "magic eye" is connected by the intermediary of a resistance of 0.8 megohm, to the anode of the amplifying tube which is connected to the positive pole of the high tension by means of a suitable resistance whose magnitude depends on the characteristics of the amplifying tube used.

Instead of using a "magic eye" as an indicator, it is possible to employ a neon lamp. In this case, it is advantageous to use a pentode as amplifying tube; this tube may, for example, be a tube known under its denomination (EF 40 or EF 42).

The neon lamp is connected, through a resistance of a magnitude of about $10k$ ohms to the anode, which is itself connected to the positive pole of the high tension through the intermediary of a resistance. The other pole of the neon lamp is connected to the heating tension of the tube used (6.3 volts alternating) whose second pole is grounded.

The operating point (tension at the anode) of the amplifying tube (equal to the tension lighting up the neon lamp), is obtained by acting on the voltage of the screen-grid of the amplifying tube.

The operating point being fixed, a potential variation of the grid-control alters the working direction of the neon lamp (extinguishing or lighting up).

Two neon lamps in series may also be used between the positive pole of the high tension and ground. The pole common to these lamps is connected by the intermediary of a resistance to the anode of the amplifying tube.

By suitably selecting the operating point, the potential variation of the grid-control at the titration end-point, brings about, with a slight displacement, the extinction of one neon lamp and the lighting up of the other.

As is well known, the titration properly so called of the solution is achieved by pouring into the solution to be titrated, known quantities of a titrating solution, of well-defined characteristics, which enables the quantity of the titrating solution added to be accurately ascertained when the indicator shows that titration has occurred, i.e., when the solution is titrated and neutralised.

According to one preferred form of embodiment of an apparatus for achieving titration and operating as mentioned above, a rectifying device of the kind currently employed is used which can, for example, consist of a transformer of an electronic rectifier circuit which may comprise, for example, a bi-plate tube 1 mounted in a circuit comprising two condensers $C_1$, $C_2$ and a filtering inductance L. The rectifying device is devised so as to supply a tension that may be, for example, of about 300 volts. The positive pole of the rectifying device, supplying the high tension, is connected, on the one hand, through the inductance L and a load resistance $R_1$, to the anode of a neon lamp 2, whose cathode is grounded. The neon lamp is intended to supply a direct tension stabilised and feeding a circuit in parallel which comprises a filtering condenser $C_3$ and a potentiometric circuit comprising a fixed resistance $R_2$ and a variable potentiometer $p_1$.

The magnitude of the fixed $R_2$ and potentiometric $p_1$ resistances is selected so that the tension at the positive pole 3 of the potentiometer circuit has a given value which is stabilised by the neon lamp. This pole 3 of the potentiometric circuit is connected, through a very large resistance $R_6$ to a platinum electrode 4 placed inside a vessel in which the solution to study is placed.

So that the solution is always homogeneous during the sequence of measuring operations intended to determine the end point in a titration, it is advisable that a stirring device be mounted in the receptacle. This device can be a stirrer of a conventional type, for example, a stirrer of the magnetic, mechanical or other type.

A second platinum electrode 5 is provided to be placed inside the vessel; like the electrode mentioned above, this second electrode being grounded.

The platinum electrode 4, which is connected to the positive pole of the potentiometric circuit is furthermore connected, by the intermediary of a resistance $R_4$ to the grid of the first triode of a double triode 6, for example, a tube known under the name of "E.CC.40."

The slide contact of the potentiometer $p^1$ is connected, by the intermediary of a resistance $R_3$, to the grid of the second triode of the double triode. The two cathodes of the double triode are short-circuited and the common point is grounded by a resistance $R_5$.

The two anodes of the double triode are connected to identical resistances $R_9$, $R_{10}$ which connect them to the two fixed poles of a second potentiometer $p_2$. This second potentiometer $p_2$ has the plug of its slide contact connected to the positive pole of the high tension.

In this manner, if the potentials of the two grids are equal with regard to the ground, there is no tension between the two anodes, provided, however, that the two load resistances $R_9$, $R_{10}$ and the characteristics of the two tubes are identical. This condition may be obtained by acting on the potentiometer $p_2$.

In the event of the potentials being different, the difference of the anode potentials is measured by means of a switchboard voltmeter V of great internal resistance and preferably with multiple sensitivities.

To carry out the titration of a solution, the following procedure is adopted, for example:

The titrating vessel is partially filled with solution, then the stirring device is put into operation. The platinum electrodes 4, 5 are then immersed into the solution, then the voltmeter 7 is adjusted to its minimum sensitivity position.

These preliminary operations being carried out, the voltmeter has its needle brought to zero, by acting on the slide contacts of the two potentiometers $p_1$ and $p_2$, foreseen partly for that purpose.

The sensitivity of the voltmeter is then regulated with relation to the accuracy of the results that are sought to be obtained. Titrating operations properly so called commence at that moment, and while they are taking place, the deviation $d$ of the needle of the voltmeter is noticed.

The curve $d=f(V)$ is drawn, according to which $d$ designates the deviations of the needle of the voltmeter and V the volume of the titrating solution added.

In another operating method, one can by adjustment of the potentiometers after each addition of given quantity of $\Delta V$ of the titrating solution return the needle to the zero point and the magnitude $d$ of the successive deflections can be used to draw the curve:

$$\frac{\Delta d}{\Delta V}=f(V)$$

As already explained above, the state of polarisation of the platinum electrodes alters abruptly at the conclusion of titration and hence, the electrode potentials also change at that moment. It must be noted that the electrolysis current undergoes a change at the same time. This means that the curve $d=f(V)$ shows, at that moment, an inflection point that accurately indicates the conclusion of titrating operations.

By way of example, an apparatus such as that described above, may be devised so that the high tension equals 300 volts. The load resistance $R_1$, connected to the anode of the neon lamp 2, is selected so that the latter supplies a stabilised direct current that may be comprised between 70 and 150 volts. The filtering condenser $C_3$ of the potentiometric circuit may, for example, have a capacity of 4 $\mu f$. The values of the fixed $R_2$ and variable $p_1$ resistances of the potentiometric circuit are computed so as to obtain, at the positive pole 3 of the latter, a tension comprised between 2.8 and 3.2 volts. The resistance $R_6$ connecting the platinum electrode to the positive pole of the potentiometric circuit, has a resistance of 0.1 to 1 megohm. The resistance $R_1$, placed between the grid of the first triode and the positive electrode, is about 0.5 megohm. The resistance $R_3$, inserted between the grid of the second triode and the slide contact of the potentiometer $p_1$, is about 1 megohm. The resistance $R_5$, inserted between the ground and the common point mentioned at the beginning of the specification, is about 500 ohms. The identical resistances $R_9$, $R_{10}$, connecting the two anodes of the double triode to the fixed poles of the potentiometer $p_2$, have a magnitude of about $10^4$ ohms, whereas the potentiometer $p_2$ itself has a resistance with a magnitude of about $10^3$ ohms. These various values, which have given particularly good results, may, however, be altered, more particularly to modify, in one direction or the other, the sensitivity of the apparatus manufactured.

The diagram of Fig. 2 shows a particular method of control either by means of an automatic burette (not shown) intended to convey the titrating solution into the vessel containing the solution to be titrated, or control an electrolysis current intended to achieve titration (coulometry).

According to this diagram, an electro-magnetic relay 8 is branched in the anodic circuit of an amplifying tube 9 preferably with high transconductance.

The tube has its anode connected to the positive pole of a second high tension generator similar to the one described above and its cathode is connected to the negative pole of the high tension generator. The screen-grid of this tube is fed by a potentiometric circuit $R_7$ and $R_8$.

In the diagram shown, the tension indicated by the voltmeter 7 is applied between the conductors 10, 11 capable of being branched to the anodes of the double triode 6, so that this voltage is applied between the grid and the cathode of the tube 9. In this way, when the voltmeter goes to zero, the relay 8 closes a secondary circuit (not shown), which causes the working of the titrating burette or the input of the electrolysis current, to stop.

According to one alternative form of realisation, the multiple sensitiveness switchboard voltmeter is replaced by a recording apparatus, which may, for example, comprise a tape or paper strip moved by a suitable mechanism whose movement is controlled by the consumption of the titrating solution. In this manner, the curve $d=f(V)$ is automatically drawn, which affords a direct reading of the result of the measurement.

The invention is not restricted to the forms of embodiment described in detail, for various modifications may be applied to it without going outside its scope for the purpose.

In particular, the electric characteristics of the tubes and instruments employed for forming the apparatus may vary, but in that case, it is necessary that the voltages applied at the electrodes, as well as the stabilisation resistances, should be carefully selected.

I claim:

1. A titrating device for indicating changing of electrode polarization to determine an inflection point appearing on a curve drawn to show voltage indications in function of added titrating solution in a solution to be titrated, comprising a high voltage current generator, stabilizer means connected to said generator for rectification and stabilization of the generated current to obtain a stabilised direct current, said stabilizer means including an anode connected through a potentiometrically controlled circuit and a large resistance to a first electrode to be at least in part immersed into the solution to be titrated, a second electrode also to be at least in part immersed into the solution to be titrated, said second electrode being grounded, two amplifying devices respectively connected to said two electrodes to differentially amplify the voltage variations between said two electrodes during titration, and a measuring apparatus inserted between said two amplifying devices to determine any changing of electrode polarization.

2. A device according to claim 1, in which the direct current stabilizer means is placed between the output terminals of the current generator and comprises a neon lamp fed by the intermediary of a load resistance.

3. A device according to claim 2, comprising means in said vessel for stirring the solution in which the electrodes are immersed to ensure the homogenization of the solution to be titrated with added titrating solution.

4. A device as set forth in claim 1, comprising a first circuit with a first potentiometer and a fixed resistance inserted between said first electrode and said stabilizer means acting as a direct current source, said resistance enabling the voltage stabilized by said stabilizer means to be lowered, and a second circuit also connected to said first electrode and provided with a resistance, a double triode to one grid of which said resistance is connected while the second grid is connected to a fixed resistance in electric connection with the movable slide contact of said first potentiometer of the first circuit, said double triode having further its two cathodes connected together by means of a short-circuiting connection then a fixed resistance connecting the middle point of said short-circuiting connection with earth and said double triode having further its two anodes provided with two identical resistances respectively in electric connection with both ends of a second potentiometer having a slide contact electrically connected to the current source under relatively high voltage.

5. A device as set forth in claim 4, comprising as measuring apparatus a voltmeter inserted in electric connection between said two anodes of said double triode.

6. A device as set forth in claim 1, comprising an amplifying member electrically connected to the terminals of said measuring apparatus, and a control relay the starting of which is controlled by said amplifying member so that said control relay acts to regulate the operation of a burette containing the titrating solution to be added to the solution to be titrated to automatically obtain the titration of the latter.

7. A device as set forth in claim 6, in which said amplifying member comprises an amplifying tube the grid and cathode of which are respectively subjected to the voltage which occurs at the terminals of the measuring apparatus.

8. A device according to claim 1, in which the electrodes immersed into the solution to be titrated are of platinum.

References Cited in the file of this patent

UNITED STATES PATENTS

| | | |
|---|---|---|
| 2,367,949 | Langer | Jan. 23, 1945 |
| 2,526,857 | Chaney | Oct. 24, 1950 |
| 2,645,563 | Jensen | July 14, 1953 |
| 2,666,691 | Robinson et al. | Jan. 19, 1954 |
| 2,668,097 | Hallikainen et al. | Feb. 2, 1954 |
| 2,740,694 | Frediani | Apr. 3, 1956 |
| 2,745,804 | Shaffer | May 15, 1956 |
| 2,770,531 | Hawes | Nov. 13, 1956 |

FOREIGN PATENTS

| | | |
|---|---|---|
| 923,945 | France | Feb. 24, 1947 |
| 612,155 | Great Britain | Nov. 9, 1948 |